(12) United States Patent
Chiang et al.

(10) Patent No.: US 11,635,600 B2
(45) Date of Patent: Apr. 25, 2023

(54) VEHICLE PROJECTION LENS AND VEHICLE LAMP

(71) Applicant: Young Optics Inc., Hsinchu Science Park (TW)

(72) Inventors: Chen-An Chiang, Hsinchu Science Park (TW); S-Wei Chen, Hsinchu Science Park (TW)

(73) Assignee: YOUNG OPTICS INC., Hsinchu Science Park (TW)

( * ) Notice: Subject to any disclaimer, the term of this patent is extended or adjusted under 35 U.S.C. 154(b) by 30 days.

(21) Appl. No.: 17/470,759

(22) Filed: Sep. 9, 2021

(65) Prior Publication Data

US 2022/0397745 A1    Dec. 15, 2022

(30) Foreign Application Priority Data

Jun. 7, 2021    (TW) ................. 110120645

(51) Int. Cl.
  *G02B 13/16*    (2006.01)
  *F21S 41/141*    (2018.01)
  *G02B 9/34*    (2006.01)
(52) U.S. Cl.
  CPC ............ *G02B 13/16* (2013.01); *F21S 41/141* (2018.01); *G02B 9/34* (2013.01)

(58) Field of Classification Search
  CPC .......... G02B 13/16; G02B 9/34; F21S 41/141
  USPC .................................................. 359/649–650
  See application file for complete search history.

(56) References Cited

U.S. PATENT DOCUMENTS 9,074,747 B2    7/2015    Abe
2010/0323299 A1*    12/2010    Dodoc ................ G03F 7/70241
                                                        359/649
2020/0379269 A1*    12/2020    Liu ........................ G02B 7/028

FOREIGN PATENT DOCUMENTS

| CN | 104471310 A | 3/2015 |
| CN | 105351839 B | 2/2018 |
| TW | I546491 B | 8/2016 |
| TW | I637125 B | 10/2018 |

* cited by examiner

*Primary Examiner* — George G. King
(74) *Attorney, Agent, or Firm* — Muncy, Geissler, Olds & Lowe, P.C.

(57) ABSTRACT

A vehicle projection lens includes a plastic aspheric first lens, an aperture stop, a cemented lens consisting of a glass second lens and a glass third lens, and a glass fourth lens arranged in order from a magnified side to a minified side. An F-number of the vehicle projection lens is smaller than or equal to 0.8, and the vehicle projection lens consists essentially of four lenses respectively with positive, positive, negative and positive refractive powers.

20 Claims, 3 Drawing Sheets

VEHICLE PROJECTION LENS AND VEHICLE LAMP

BACKGROUND OF THE INVENTION a. Field of the Invention

The invention relates to a projection lens and, more particularly, to a vehicle projection lens used with a vehicle headlamp.

b. Description of the Related Art

Nowadays, cars are the most commonly used tools for transportation available in the market, and a vehicle headlamp, allowing drivers to recognize the state of the environment ahead, is an extremely important component of a car. Except for the effect of identifying the environment ahead, a lighted headlamp may allow surrounding people to know the driver's current location and thus provide a certain degree of warning effects. However, traditional vehicle headlamps only have two control types, low beam lighting and high beam lighting, thus failing to fully satisfy the driver's needs.

Currently, a vehicle headlamp capable of projecting image patterns is available in the market. In addition, a projection lens used in a typical projection apparatus often fails to meet light pattern requirements for vehicle headlamps specified in government regulations. Moreover, a compromise between fabrication costs and imaging qualities for vehicle lamp designs should be also reached. Therefore, it is desirable to provide a vehicle projection lens that may achieve wide viewing angles, lager effective apertures, wide ranges of operating temperature, low fabrication costs, high imaging qualities, and compliance with government regulations specifying light pattern requirements.

The information disclosed in this "BACKGROUND OF THE INVENTION" section is only for enhancement understanding of the background of the invention and therefore it may contain information that does not form the prior art already known to a person of ordinary skill in the art. Furthermore, the information disclosed in this "BACKGROUND OF THE INVENTION" section does not mean that one or more problems to be solved by one or more embodiments of the invention is acknowledged by a person of ordinary skill in the art.

BRIEF SUMMARY OF THE INVENTION

According to one aspect of the present disclosure, a vehicle projection lens that, when satisfying certain conditions, complies with government regulations specifying safety requirements is provided.

According to another aspect of the present disclosure, a vehicle projection lens having large effective apertures and small F-numbers to allow products used with the vehicle projection lens to have improved brightness is provided.

According to another aspect of the present disclosure, a vehicle projection lens having low fabrication costs and high imaging qualities when satisfying certain conditions is provided.

According to another aspect of the present disclosure, a vehicle projection lens having a wide range of operating temperature (−20 to 80 degrees) is provided.

In one embodiment, a vehicle projection lens includes a plastic aspheric first lens, an aperture stop, a cemented lens consisting of a glass second lens and a glass third lens, and a glass fourth lens arranged in order from a magnified side to a minified side. An F-number of the vehicle projection lens is smaller than or equal to 0.8, and the vehicle projection lens consists essentially of four lenses respectively with positive, positive, negative and positive refractive powers.

In one embodiment, a vehicle projection lens includes a non-glass first lens, a glass second lens having a positive refractive power, a glass third lens having a refractive power, a glass fourth lens having a positive refractive power, and an aperture stop disposed between the first lens and the second lens. The first lens is an aspheric lens and has a largest lens diameter as compared with any other lens in the vehicle projection lens, and the vehicle projection lens consists essentially of four lenses with refractive powers and has an F-number of smaller than or equal to 0.8.

In one embodiment, a vehicle lamp includes a light source comprised of an LED array, a vehicle projection lens disposed downstream from and in a light path of the light source, and a vehicle lampshade disposed downstream from and in a light path of the vehicle projection lens. The vehicle projection lens includes a non-glass aspheric first lens, a glass second lens having a positive refractive power, a glass third lens having a refractive power, a glass fourth lens having a positive refractive power, and an aperture stop disposed between the first lens and the second lens. The vehicle projection lens has an F-number of smaller than or equal to 0.8.

In accordance with the above embodiments, the vehicle projection lens may comply with government regulations specifying safety requirements for vehicle lighting and may have large effective apertures and small F-numbers to allow products used with the vehicle projection lens to have improved brightness and luminous efficiency. In addition, the vehicle projection lens and a vehicle lamp used with the vehicle projection lens may have a plastic first lens and a cemented lens to make a compromise between low fabrication costs and high imaging qualities. Further, in the vehicle projection lens or a vehicle lamp used with the vehicle projection lens, the three lenses closest to the minified side/light source can be made from glass to achieve a wide range of operating temperature.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF THE INVENTION

In the following detailed description of the preferred embodiments, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. Further, "First," "Second," etc., as used herein, are used as labels for nouns that they precede, and do not imply any type of ordering (e.g., spatial, temporal, logical, etc.).

The term "lens" refers to an element made from a partially or entirely light-transmissive material with optical power. The material commonly includes plastic or glass. The lens may be, a general lens, a prism, an aperture stop, a cylindrical lens, a bi-conical lens, a cylindrical array lens, a wedge lens, a wedge, or a combination of the foregoing elements.

In an optical projection system, a magnified side (image side) may refer to one side of an optical path of an optical lens comparatively near a projected image (such as a projection screen), and a minified side (object side) may refer to other side of the optical path comparatively near a light source or a light valve.

A certain region of an object side surface (or an image side surface) of a lens may be convex or concave. Herein, a convex or concave region is more outwardly convex or inwardly concave in the direction of an optical axis as compared with other neighboring regions of the object/image side surface.

Figure 1:
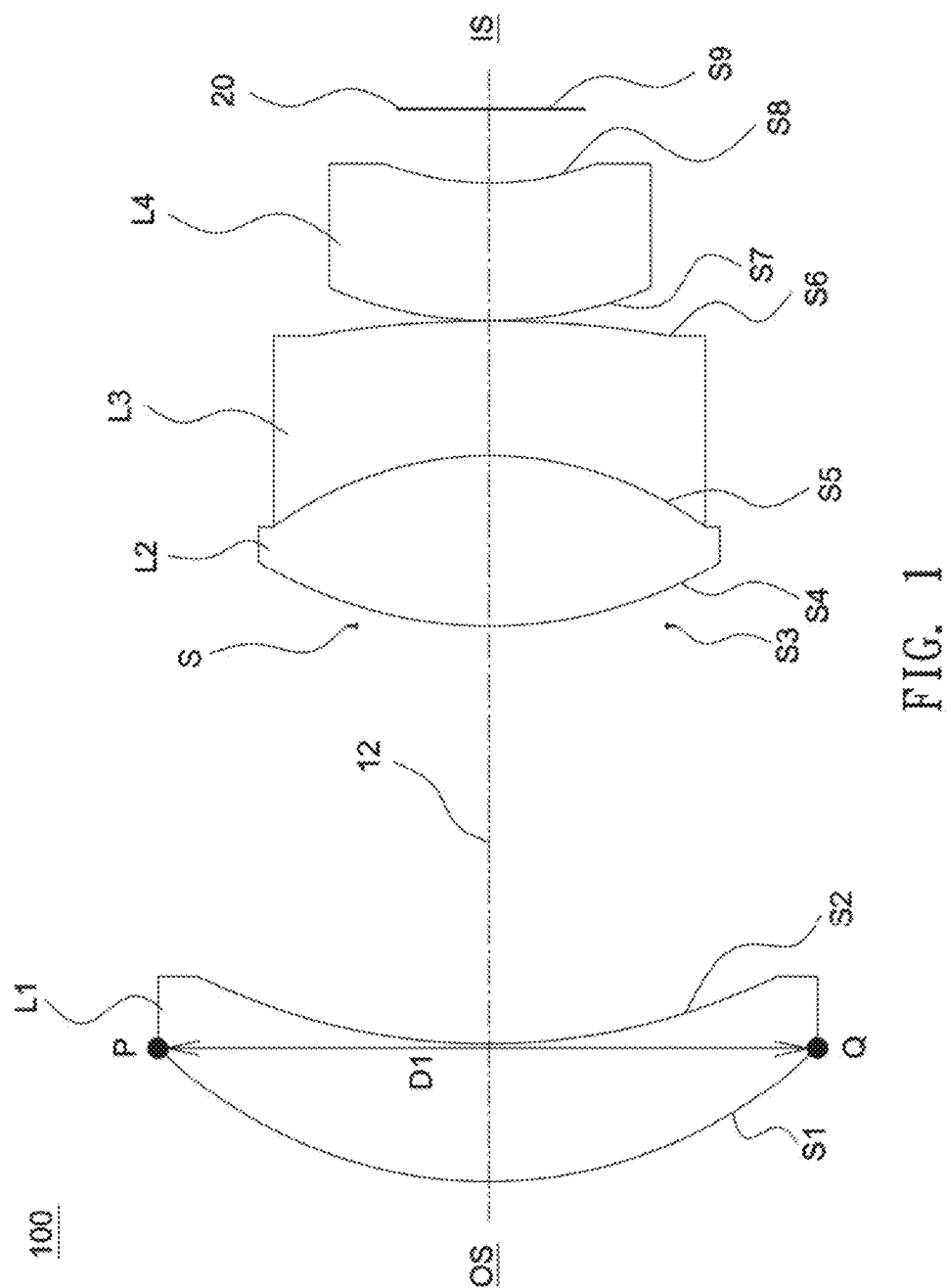
FIG. 1 shows a schematic cross-section of a vehicle projection lens in accordance with an embodiment of the invention.
Figure 2:
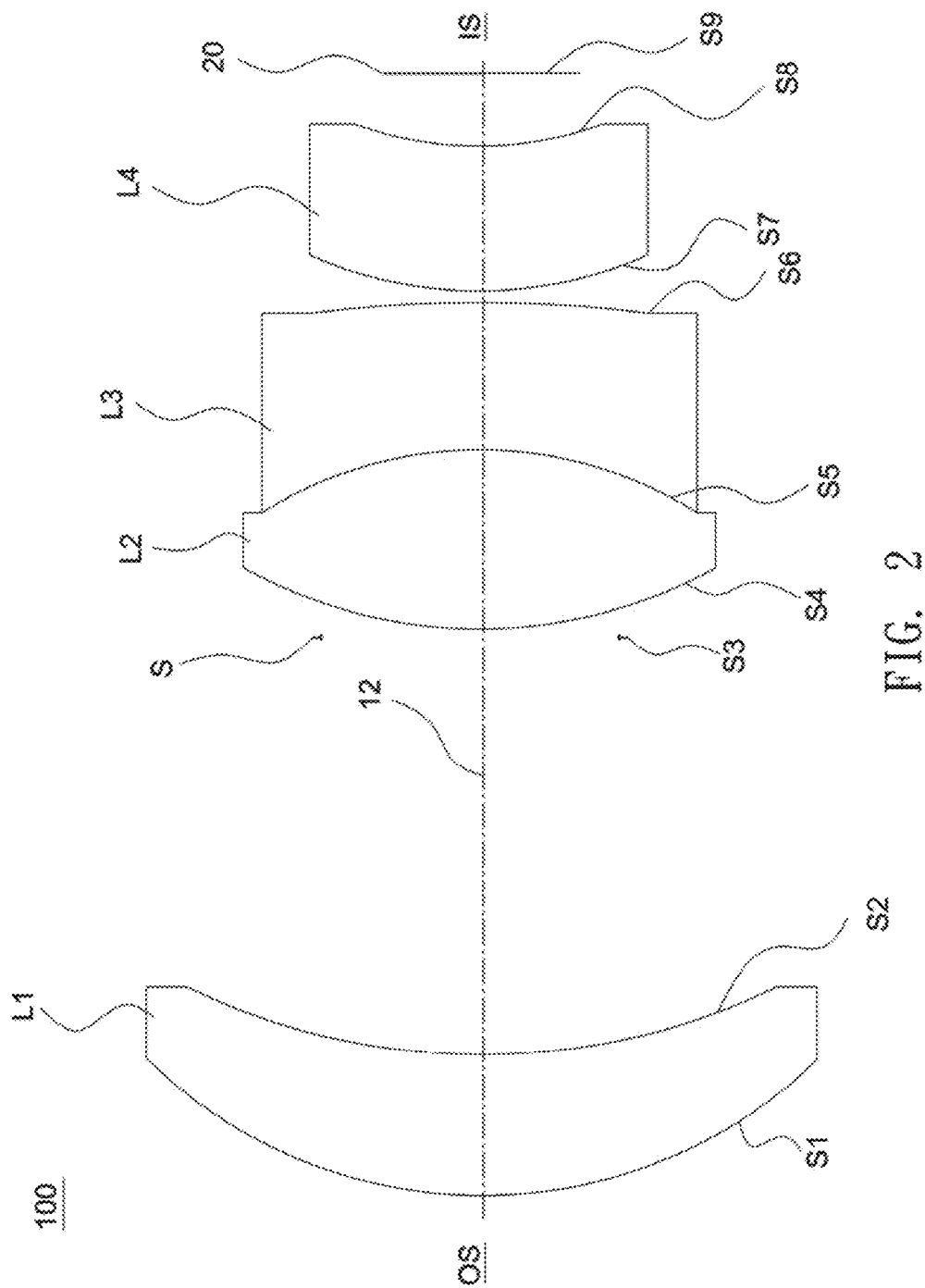
FIG. 2 shows a schematic cross-section of a vehicle projection lens in accordance with another embodiment of the invention.
Figure 3:
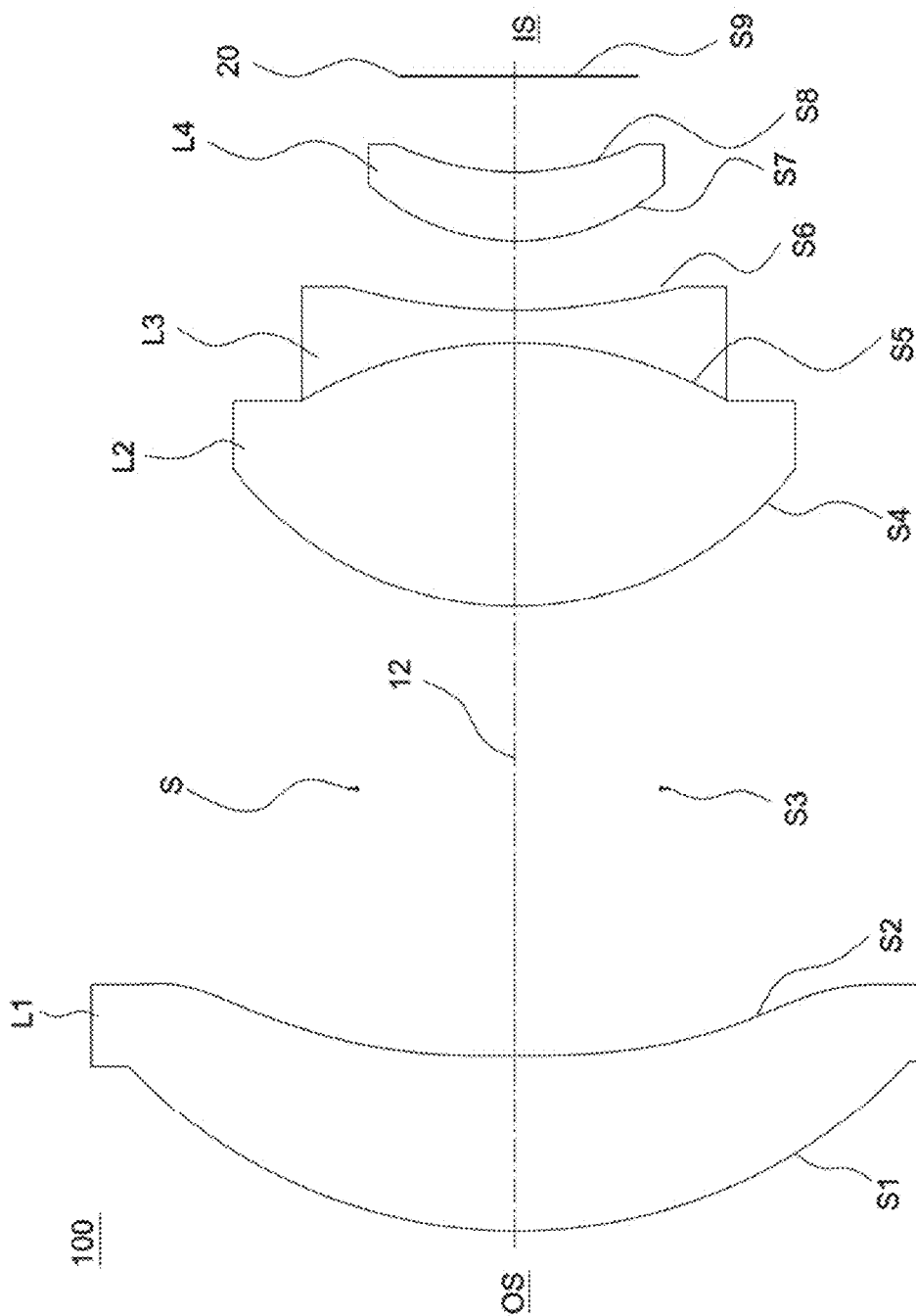
FIG. 3 shows a schematic cross-section of a vehicle projection lens in accordance with another embodiment of the invention.

FIG. 1 shows a schematic cross-section of a vehicle projection lens 100 in accordance with an embodiment of the invention. As shown in FIG. 1, in this embodiment, the vehicle projection lens 100 is disposed between a first side (image magnified side OS or briefly referred to as magnified side) and a second side (image minified side IS or briefly referred to as minified side), the vehicle projection lens 100 has a lens barrel (not shown), and inside the lens barrel a lens L1 (also referred to as a first lens), an aperture stop S, a lens L2 (also referred to as a second lens), a lens L3 (also referred to as a third lens) and a lens L4 (also referred to as a fourth lens) are arranged in order from the image magnified side OS to the image minified side IS. Besides, a light source 20 may be disposed on the image minified side IS. By way of example, the light source 20 can be, but is not limited to, an LED array, a matrix-type light source, a micro LED array, a light valve, and the like. The vehicle projection lens 100 may project pattern beams onto an image plane (not shown) via a vehicle lampshade (not shown).

In this embodiment, the vehicle projection lens 100 consists essentially of four lenses with refractive powers, and the refractive powers of the first lens L1 to the fourth lens L4 are positive, positive, negative and positive, respectively. In this embodiment, the first lens L1 is a plastic aspheric lens, the second lens L2, the third lens L3 and the fourth lens L4 are glass spherical lens, and the second lens L2 and the third lens L3 together form a cemented lens. In each of the following embodiments, the image magnified side OS is located on the left side and the image minified side IS is located on the right side of each figure, and thus this is not repeatedly described in the following for brevity. In addition, each lens is not limited to have specific optical power. By way of example, the first lens L1 can be assigned a negative refractive power if desired because the first lens L1 is an aspheric lens, and the third lens L3 can be assigned a positive refractive power if desired.

The aperture stop S may be an independent component or integrally formed with other optical element. In this embodiment, the aperture stop may use a mechanic piece to block out peripheral light and transmit central light to achieve aperture effects. The mechanic piece may be adjusted by varying its position, shape or transmittance. In other embodiment, the aperture stop may be formed by applying an opaque or a light-absorbing material on a lens surface except for a central area to block out peripheral light and transmits central light.

Each of the lenses L1-L4 may be assigned a parameter of "lens diameter", and the "lens diameter" is defined by a distance between outermost turning points of the lens at opposite ends of the optical axis 12. For example, as shown in FIG. 1, the magnified-side surface of the first lens L1 has two opposite turning points P and Q (outermost turning points) that are spaced at a distance measured in a direction perpendicular to the optical axis 12, and such distance is referred to as a lens diameter D1 of the lens L1. In this embodiment, the lens diameter D1 of the first lens L1 is 47.27 mm, the lens diameter D2 of the second lens L2 is 33.12 mm, and a ratio of the lens diameter D1 of the first lens L1 to the lens diameter D2 of the second lens L2 is greater than 1.4. In this embodiment, the vehicle projection lens 100 includes at least one lens with a refractive power that has a lens diameter within a range of 40 mm to 60 mm.

A spherical lens indicates its front lens surface and rear lens surface are each a part surface of a sphere having a fixed radius of curvature. In comparison, an aspheric lens indicates at least one of its front lens surface and rear lens surface has a radius of curvature that varies along a center axis. Detailed optical data and design parameters of the vehicle projection lens 100 are shown in Table 1 below. Note the data provided below are not used for limiting the invention, and those skilled in the art may suitably modify parameters or settings of the following embodiment with reference of the invention without departing from the scope or spirit of the invention.

Table 1 lists the values of parameters for each lens of an optical system, where the surface symbol denoted by an asterisk is an aspherical surface, and a surface symbol without the denotation of an asterisk is a spherical surface. Besides, the radius of curvature, thickness/interval and diameter shown in Table 1 are all in a unit of mm.

TABLE 1

F/# = 0.70; EFL = 31.57(mm); TTL = 76.88(mm)
OAL = 71.67(mm); FOV = 24 degrees; D1/OAL = 0.660
IM = 13.6(mm); D1/IM = 3.48; D1/D2 = 1.427

| Surface | Radius(mm) | Thickness/ Interval(mm) | Refractive index | Abbe number | diameter | Object description |
| --- | --- | --- | --- | --- | --- | --- |
| S1* | 34.73 | 10.00 | 1.492 | 57.44 | 47.27 | L1(meniscus) |
| S2* | 76.07 | 29.72 | | | 42.50 | |
| S3 | INF | 0.25 | | | 34.16 | |
| S4 | 32.68 | 12.06 | 1.788 | 47.52 | 33.12 | L2(biconvex) |
| S5 | −29.01 | 9.39 | 1.847 | 23.79 | 31.40 | L3(meniscus) |
| S6 | −123.09 | 0.25 | | | 25.20 | |

TABLE 1-continued

F/# = 0.70; EFL = 31.57(mm); TTL = 76.88(mm)
OAL = 71.67(mm); FOV = 24 degrees; D1/OAL = 0.660
IM = 13.6(mm); D1/IM = 3.48; D1/D2 = 1.427

| Surface | Radius(mm) | Thickness/ Interval(mm) | Refractive index | Abbe number | Object diameter | description |
|---|---|---|---|---|---|---|
| S7 | 26.43 | 10.00 | 1.804 | 46.57 | 22.96 | L4(meniscus) |
| S8 | 24.90 | 5.21 | | | 16.17 | |
| S9 | | | | | 13.90 | LED array |

In the above Table 1, the field heading "interval" represents a distance between two adjacent surfaces along the optical axis 12 in the vehicle projection lens 100. For example, an interval of the surface S1 is a distance between the surface S1 and the surface S2 along the optical axis 12, an interval of the surface S2 is a distance between the surface S2 and the surface S3 along the optical axis 12, and an interval of the surface S8 is a distance between the surface S8 and a light-emitting surface S9 of the LED array along the optical axis 12. Further, the interval, refractive index and Abbe number of any lens listed in the column of "Object description" show values in a horizontal row aligned with the position of that lens. Moreover, in table 1, the surfaces S1 and S2 are respectively the magnified-side surface and minified-side surface of the lens L1, the surfaces S4 and S5 are respectively the magnified-side surface and minified-side surface of the lens L2, and the remaining lens surfaces are classified by analogy so that related descriptions are omitted for sake of brevity. The major surface of the aperture stop S is denoted by the surface S3 and has an infinite radius of curvature (i.e. a plane perpendicular to the optical axis 12). As can be seen from Table 1, in this embodiment, the second lens L2 and the third lens L3 together form a cemented lens, and the surface S5 is a cemented surface (i.e. the second lens L2 and the third lens L3 share the same surface S5).

The radius of curvature is a reciprocal of the curvature. When a lens surface has a positive radius of curvature, the center of the lens surface is located towards the minified side. When a lens surface has a negative radius of curvature, the center of the lens surface is located towards the magnified side. The concavity and convexity of each lens surface is listed in the above table and shown in corresponding figures. By way of example, the first lens L1 is a meniscus lens, and the second lens L2 is a bi-convex lens.

The symbol F/# shown in the above table stands for F-number of the vehicle projection lens. When the vehicle projection lens 100 is used in an optical projection system, the image plane is located in the image magnified side OS. In at least some embodiments, the F-number of the vehicle projection lens may be smaller than or equal to 0.8. In this embodiment, the F number of the vehicle projection lens is 0.70.

In this embodiment, an image height IM shown in the above table is equal to an image circle diameter (a diagonal length of a light-emitting area of a matrix-type light source, e.g., an LED array).

In this embodiment, the symbol OAL shown in the above table stands for an overall length of the optical lens 100. Specifically, the overall length OAL is a distance along the optical axis 12 between an optical surface S1 closest to the magnified side OS and an optical surface S8 closest to the minified side IS. In at least some embodiments, the overall length OAL of the vehicle projection lens 100 is smaller than 75 mm. In this embodiment, the overall length OAL is 71.67 mm.

In this embodiment, a total track length of the optical lens 100 is denoted as "TTL" in the above table. Specifically, the total track length TTL is a distance along the optical axis 12 between the optical surface S1 closest to the magnified side OS and a light-emitting surface S9 of the light source 20. In at least some embodiments, the total track length TTL of the vehicle projection lens 100 is smaller than 90 mm, preferably smaller than 80 mm. In this embodiment, the total track length TTL is 76.88 mm.

In this embodiment, a back focal length of the vehicle projection lens 100 is denoted as "BEF". Specifically, the back focal length BEF is a distance along the optical axis 12 between a lens surface closest to the minified side IS (such as the surface S8 in this embodiment) and a light-emitting surface S9 of the light source 20. In at least some embodiment, the back focal length BEF is smaller than 6 mm, preferably smaller than 5.5 mm, and greater than 3.5 mm. In this embodiment, the back focal length BEF is 5.21 mm. In addition, a ratio of BFL/TTL is within a range of 0.05 to 0.10 and preferably 0.05 to 0.08. In this embodiment a ratio of BFL/TTL is 0.068.

In this embodiment, a ratio of an Abbe number of the first lens L1 to an Abbe number of the third lens L3 is within a range of 1.8 to 3 and preferably 2.2 to 2.6. In this embodiment, the ratio of Abbe number is 2.41.

In at least some embodiments, the vehicle projection lens 100 may satisfy the following conditions. A ratio of a lens diameter D1 of the first lens L1 to the overall length OAL is within a range of 0.6 to 1.00 and more preferably 0.65 to 0.8. A ratio of a lens diameter D1 of the first lens L1 to a lens diameter D2 of the second lens L2 is greater than 1.35 and smaller than 1.6, and preferably greater than 1.4 and smaller than 1.55. An interval between the first lens L1 and the second lens L2 (distance between the surface S2 and surface S4 along the optical axis 12) is within a range of 20 mm to 35 mm, preferably 25 mm to 30 mm. A ratio of an interval between the first lens L1 and the second lens L2 to the overall length OAL is within a range of 0.33 to 0.45, preferably 0.35 and 0.43, and more preferably 0.39 to 0.43. In at least some embodiment, a ratio of a lens diameter D1 of the first lens L1 to an image height IM is greater than 3 and preferably greater than 3.3. In this embodiment, the ratio of a lens diameter D1 of the first lens L1 to the overall length OAL is 0.66, the ratio of a lens diameter D1 of the first lens L1 to a lens diameter D2 of the second lens L2 is 1.43, the interval between the first lens L1 and the second lens L2 is 29.97 mm, the ratio of an interval between the first lens L1 and the second lens L2 to the overall length OAL is 0.42, and the ratio of a lens diameter D1 of the first lens L1 to the image height IM is 3.48.

In this embodiment, FOV denoted in the above table stands for a light collection angle of an optical surface S1 closest to the magnified side OS; that is, the FOV is a full field of view measured by a horizontal line and a vertical line. In this embodiment, the full field of view FOV is 24 degrees. In an alternate embodiment, the full field of view FOV is 20 degrees. In at least some embodiments, a relative illumination is greater than or equal to 50% at a full field of view of 20 degrees. In this embodiment, the vehicle projection lens 100 is a fixed-focus lens.

In at least some embodiments, the vehicle projection lens 100 may project light beams emitted from a matrix-type light source and having an aspect ratio within a range of 2.5:1 to 6:1 onto the ground, and a distance between a vehicle lampshade and light beams projected on the ground is within a range of 5 m to 25 m. In at least some embodiments, the modulation transfer function (MTF) for the vehicle projection lens 100 is smaller than 50% measured at a spatial frequency of 10 lp/mm and a wavelength of 550 mm. In an alternate embodiment, the modulation transfer function (MTF) for the vehicle projection lens 100 is smaller than 30% measured at a spatial frequency of 10 lp/mm and a wavelength of 550 mm.

In at least some embodiments, an F number of the vehicle projection lens 100 is smaller than or equal to 0.8. In this embodiment, an F number of the vehicle projection lens 100 is smaller than or equal to 0.7. The vehicle projection lens 100 may have at least one compound lens to facilitate correction of chromatic aberrations. A minimum distance between two adjacent lenses of the compound lens along an optical axis is smaller than or equal to 0.01 mm. Adjoining surfaces of each two adjacent lenses of a compound lens (such as a cemented lens, a doublet lens, a triplet lens or even higher number lens configurations) may have an identical radius of curvature or a similar radius of curvature. In at least some embodiments, the vehicle projection lens has a total number of four lenses with refractive powers and an operating temperature within a range of at least −20 to 80 degrees.

In this embodiment, the aspheric equation describing the aspherical surfaces S1 and S2 may be given by:

$$Z = \frac{cr^2}{1+\sqrt{1-(1+k)c^2r^2}} + A_2r^2 + A_4r^4 + A_6r^6 + A_8r^8 + A_{10}r^{10} + A_{12}r^{12} + \ldots \quad (1)$$

where Z is a sag of an aspherical surface parallel to the optical axis 12, c is the curvature at the pole or vertex of the surface (the reciprocal of the radius of curvature of the surface), k is the conic constant, r is a height of the aspherical surface measured in a direction perpendicular to the optical axis 12, and $A_2$, $A_4$, $A_6$, $A_8$, $A_{10}$, $A_{12}$, etc. are the aspheric coefficients. In this embodiment, the conic constant and aspheric coefficient $A_2$ are both zero. The aspheric coefficients of the surface S1 and the surface S2 are listed in Table 2 below.

TABLE 2

| surface | $A_4$ | $A_6$ | $A_8$ | $A_{10}$ | $A_{12}$ |
|---|---|---|---|---|---|
| S1* | 1.5799E−05 | 4.8328E−09 | 1.7233E−11 | −7.0290E−14 | 6.4163E−17 |
| S2* | 4.2231E−06 | 5.9464E−08 | −7.2405E−11 | −6.3310E−14 | 1.5676E−16 |

Another embodiment of the vehicle projection lens 100 is described in the following with reference to Table 3 below that shows detailed optical data of each component. The following embodiments use similar reference numerals and contain part content of the above embodiment, where similar reference numerals refer to identical or functionally similar elements throughout the embodiments and the same technical descriptions are omitted. The content omitted may refer to the embodiment previously described and thus not described repeatedly in detail in the following embodiments.

TABLE 3

| F/# = 0.71; EFL = 31.30(mm); TTL = 76.84(mm) OAL = 71.81(mm); FOV = 24 degrees; D1/OAL = 0.634 IM = 13.6(mm); D1/IM = 3.35; D1/D2 = 1.417 | | | | | |
|---|---|---|---|---|---|
| Surface | Radius(mm) | Thickness/ Interval(mm) | Refractive index | Abbe number | diameter | Object description |
| S1* | 34.71 | 10.00 | 1.492 | 57.44 | 45.53 | L1(meniscus) |
| S2* | 76.00 | 28.34 | | | 40.60 | |
| S3 | INF | 0.25 | | | 33.52 | aperture stop |
| S4 | 32.19 | 12.30 | 1.788 | 47.52 | 32.14 | L2(biconvex) |
| S5 | −27.69 | 10.00 | 1.847 | 23.79 | 29.80 | L3(meniscus) |
| S6 | −146.31 | 0.92 | | | 26.13 | |
| S7 | 29.13 | 10.00 | 1.904 | 31.32 | 23.41 | L4(meniscus) |
| S8 | 30.60 | 5.02 | | | 16.66 | |
| S9 | | | | | 13.43 | LED array |

As can be seen from Table 3, in this embodiment, the vehicle projection lens 100 consists essentially of four lenses with refractive powers, the second lens L2 and the third lens L3 together form a cemented doublet (surface S5 serving as a cemented surface), the refractive powers of the first lens L1 to the fourth lens L4 are positive, positive, negative and positive respectively, the first lens L1 is a plastic aspheric lens, and the second lens L2, the third lens L3 and the fourth lens L4 are glass spherical lenses. In addition, each lens is not limited to have specific optical power. By way of example, the first lens L1 can be assigned a negative refractive power if desired because the first lens L1 is an aspheric lens, and the third lens L3 can be assigned a positive refractive power if desired.

The Symbol F/# shown in the above table stands for F-number of the vehicle projection lens. When the vehicle projection lens 100 is used in an optical projection system, the image plane is located in the image magnified side OS. In at least some embodiments, the F-number of the vehicle projection lens may be smaller than or equal to 0.8. In this embodiment, the F-number of the vehicle projection lens is 0.71.

In this embodiment, OAL shown in the above table stands for an overall length of the optical lens 100. In at least some embodiments, the overall length OAL of the vehicle projection lens 100 is smaller than 75 mm. In this embodiment, the overall length OAL is 71.81 mm.

In this embodiment, TTL shown in the above table stands for a total track length of the optical lens 100, which is a distance along the optical axis 12 between a lens surface S1 closest to the image magnified side and a light-emitting surface S9 of the light source 20. In at least some embodiments, the total track length TTL of the vehicle projection lens 100 is smaller than 80 mm. In this embodiment, the total track length TTL is 76.84 mm.

In this embodiment, BEF shown in the above table stands for a back focal length of the vehicle projection lens 100, which is a distance along the optical axis 12 between a lens surface closest to the image minified side OS and a light-emitting surface of the light source 20. In at least some embodiment, the back focal length BEF is smaller than 6 mm, and a ratio of BFL/TTL is within a range of 0.05 to 0.10. In this embodiment, the back focal length BEF is 5.02 mm, and a ratio of BFL/TTL is 0.065.

lens L2 to the overall length OAL is within a range of 0.33 to 0.45. A ratio of a lens diameter D1 of the first lens L1 to the image height IM is greater than 3. In this embodiment, the ratio of a lens diameter D1 of the first lens L1 to the overall length OAL is 0.63, the ratio of a lens diameter D1 of the first lens L1 to a lens diameter D2 of the second lens L2 is 1.42, the interval between the first lens L1 and the second lens L2 is 28.59 mm, the ratio of an interval between the first lens L1 and the second lens L2 to the overall length OAL is 0.40, and the ratio of a lens diameter D1 of the first lens L1 to the image height IM is 3.35.

In at least some embodiments, the vehicle projection lens 100 may project light beams emitted from a matrix-type light source and having an aspect ratio within a range of 2.5:1 to 6:1 onto the ground, and a distance between a vehicle lampshade and light beams projected on the ground is within a range of 5 m to 25 m. In at least some embodiments, the modulation transfer function (MTF) for the vehicle projection lens 100 is smaller than 25% measured at a spatial frequency of 10 lp/mm and a wavelength of 550 mm. In an alternate embodiment, the modulation transfer function (MTF) for the vehicle projection lens 100 is smaller than 20% measured at a spatial frequency of 10 lp/mm and a wavelength of 550 mm.

In this embodiment, the aspherical surfaces S1 and S2 are described by the above aspheric equation (1).

In this embodiment, the conic constant and aspheric coefficient $A_2$ are both zero. Aspheric coefficients of the surface S1 and the surface S2 are listed in Table 4 below.

TABLE 4

| surface | $A_4$ | $A_6$ | $A_8$ | $A_{10}$ | $A_{12}$ |
|---|---|---|---|---|---|
| S1* | 2.7054E−05 | −3.7564E−08 | 7.9461E−11 | −6.4412E−14 | 1.0847E−17 |
| S2* | −1.3955E−06 | 5.8481E−08 | −5.4619E−11 | −1.6194E−15 | 2.2503E−17 |

Another embodiment of the vehicle projection lens 100 is described in the following with reference to Table 5 below that shows detailed optical data of each component.

TABLE 5

F/# = 0.70; EFL = 31.90(mm); TTL = 67.80(mm)
OAL = 62.44(mm); FOV = 24 degrees; D1/OAL = 0.801
IM = 13.6(mm); D1/IM = 3.68; D1/D2 = 1.515

| Surface | Radius(mm) | Thickness/ Interval(mm) | Refractive index | Abbe number | diameter | Object description |
|---|---|---|---|---|---|---|
| S1* | 28.04 | 10.34 | 1.492 | 57.44 | 50.00 | L1(meniscus) |
| S2* | 46.88 | 15.84 | | | 46.00 | |
| S3 | INF | 10.46 | | | 39.40 | aperture stop |
| S4 | 21.26 | 15.40 | 1.729 | 54.67 | 33.00 | L2(biconvex) |
| S5 | −25.02 | 2.40 | 1.847 | 23.79 | 25.00 | L3(biconcave) |
| S6 | 46.08 | 3.79 | | | 19.40 | |
| S7 | 13.61 | 4.19 | 1.847 | 23.79 | 17.23 | L4(meniscus) |
| S8 | 19.06 | 5.36 | | | 15.00 | |
| S9 | | | | | 13.57 | LED array |

In at least some embodiments, the vehicle projection lens 100 may satisfy the following conditions. A ratio of a lens diameter D1 of the first lens L1 to the overall length OAL is within a range of 0.6 to 0.90. A ratio of a lens diameter D1 of the first lens L1 to a lens diameter D2 of the second lens L2 is greater than 1.4. An interval between the first lens L1 and the second lens L2 is within a range of 20 mm to 35 mm. A ratio of an interval between the first lens L1 and the second As can be seen from Table 5, in this embodiment, the vehicle projection lens 100 consists essentially of four lenses with refractive powers, the second lens L2 and the third lens L3 together form a cemented doublet (surface S5 serving as a cemented surface).

The Symbol F/# shown in the above table stands for F-number of the vehicle projection lens. When the vehicle projection lens 100 is used in an optical projection system, the image plane is located in the image magnified side OS. In at least some embodiments, the F-number of the vehicle projection lens may be smaller than or equal to 0.8. In this embodiment, the F-number of the vehicle projection lens is 0.70.

In this embodiment, OAL shown in the above table stands for an overall length of the optical lens 100. In at least some embodiments, the overall length OAL of the vehicle projection lens 100 is smaller than 75 mm. In this embodiment, the overall length OAL is 62.44 mm.

In this embodiment, TTL shown in the above table stands for a total track length of the optical lens 100, which is a distance along the optical axis 12 between a lens surface S1 closest to the image magnified side and a light-emitting surface S9 of the light source 20. In at least some embodiments, the total track length TTL of the vehicle projection lens 100 is smaller than 80 mm. In this embodiment, the total track length TTL is 67.80 mm.

In this embodiment, BEF shown in the above table stands for a back focal length of the vehicle projection lens 100, which is a distance along the optical axis 12 between a lens surface closest to the image minified side and a light-emitting surface of the light source 20. In at least some embodiment, the back focal length BEF is smaller than 6 mm, and a ratio of BFL/TTL is within a range of 0.05 to 0.10. In this embodiment, the back focal length BEF is 5.36 mm, and a ratio of BFL/TTL is 0.079.

In at least some embodiments, the vehicle projection lens 100 may satisfy the following conditions. A ratio of a lens diameter D1 of the first lens L1 to the overall length OAL is within a range of 0.6 to 0.85. A ratio of a lens diameter D1 of the first lens L1 to a lens diameter D2 of the second lens L2 is greater than 1.4. An interval between the first lens L1 and the second lens L2 is within a range of 20 mm to 35 mm. A ratio of an interval between the first lens L1 and the second lens L2 to the overall length OAL is within a range of 0.33 to 0.45. A ratio of a lens diameter D1 of the first lens L1 to the image height IM is greater than 3. In this embodiment, the ratio of a lens diameter D1 of the first lens L1 to the overall length OAL is 0.80, the ratio of a lens diameter D1 of the first lens L1 to a lens diameter D2 of the second lens L2 is 1.52, the interval between the first lens L1 and the second lens L2 is 26.30 mm, the ratio of an interval between the first lens L1 and the second lens L2 to the overall length OAL is 0.42, and the ratio of a lens diameter D1 of the first lens L1 to the image height IM is 3.68.

In this embodiment, the aspherical surfaces S1 and S2 are described by the above aspheric equation (1).

In this embodiment, the conic constant and aspheric coefficient $A_2$ are both zero. Aspheric coefficients of the surface S1 and the surface S2 are listed in Table 6 below.

TABLE 6

| surface | $A_4$ | $A_6$ | $A_8$ | $A_{10}$ | $A_{12}$ |
|---|---|---|---|---|---|
| S1* | 6.732E−06 | 6.297E−09 | −4.842E−11 | 1.456E−13 | −2.121E−16 |
| S2* | 7.045E−06 | −3.096E−08 | 1.460E−10 | −4.259E−13 | 3.154E−16 |

According to the above embodiments, the vehicle projection lens may comply with government regulations specifying safety requirements for vehicle lighting and may have large effective apertures and small F-numbers to allow products used with the vehicle projection lens to have improved brightness and luminous efficiency. In addition, the vehicle projection lens and a vehicle lamp used with the vehicle projection lens may have a plastic first lens and a cemented lens (such as a combination of the second lens L2 and the third lens L3) to make a compromise between low fabrication costs and high imaging qualities. Besides, the arrangement of optical power, i.e. positive, positive, negative and positive refractive powers in order from a magnified side to a minified side, may also help to improve imaging qualities, and the lens assembly essentially consisting of four lenses may favorably reduce fabrication costs. Further, in the vehicle projection lens or a vehicle lamp used with the vehicle projection lens, the three lenses closest to the minified side/light source can be made from glass to achieve a wide range of operating temperature.

Though the embodiments of the invention have been presented for purposes of illustration and description, they are not intended to be exhaustive or to limit the invention. Accordingly, many modifications and variations without departing from the spirit of the invention or essential characteristics thereof will be apparent to practitioners skilled in this art. It is intended that the scope of the invention be defined by the claims appended hereto and their equivalents in which all terms are meant in their broadest reasonable sense unless otherwise indicated.

What is claimed is:

1. A vehicle projection lens, comprising a plastic aspheric first lens, an aperture stop, a cemented lens consisting of a glass second lens and a glass third lens, and a glass fourth lens arranged in order from a magnified side to a minified side, wherein an F-number of the vehicle projection lens is smaller than or equal to 0.8, the vehicle projection lens consists essentially of four lenses respectively with positive, positive, negative and positive refractive powers.

2. The vehicle projection lens as claimed in claim 1, wherein a ratio of a lens diameter of the first lens to a lens diameter of the second lens is greater than 1.4.

3. The vehicle projection lens as claimed in claim 1, wherein an interval between the first lens and the second lens is within a range of 20 mm to 35 mm.

4. The vehicle projection lens as claimed in claim 1, wherein a ratio of an interval between the first lens and the second lens to an overall length of the vehicle projection lens is within a range of 0.33 to 0.45.

5. The vehicle projection lens as claimed in claim 1, wherein a ratio of an Abbe number of the first lens to an Abbe number of the third lens is within a range of 1.8 to 3.

6. The vehicle projection lens as claimed in claim 1, wherein a total track length of the vehicle projection lens is smaller than 90 mm.

7. The vehicle projection lens as claimed in claim 1, wherein a modulation transfer function for the vehicle projection lens measured at a spatial frequency of 10 lp/mm and a wavelength of 550 mm is smaller than 25%.

8. The vehicle projection lens as claimed in claim 1, wherein a ratio of a lens diameter of the first lens to an image height is greater than 3.

9. A vehicle projection lens, comprising:
a non-glass first lens, the non-glass first lens being an aspheric lens and has a largest lens diameter as compared with any other lens in the vehicle projection lens;
a glass second lens having a positive refractive power;

a glass third lens having a refractive power;
a glass fourth lens having a positive refractive power; and
an aperture stop disposed between the first lens and the second lens, the vehicle projection lens consisting essentially of four lenses with refractive powers and having an F-number of smaller than or equal to 0.8.

10. The vehicle projection lens as claimed in claim 9, wherein a ratio of the lens diameter of the first lens to the lens diameter of the second lens is greater than 1.4.

11. The vehicle projection lens as claimed in claim 9, wherein an interval between the first lens and the second lens is within a range of 20 mm to 35 mm.

12. The vehicle projection lens as claimed in claim 9, wherein a ratio of an interval between the first lens and the second lens to an overall length of the vehicle projection lens is within a range of 0.33 to 0.45.

13. The vehicle projection lens as claimed in claim 9, wherein a ratio of an Abbe number of the first lens to an Abbe number of the third lens is within a range of 1.8 to 3.

14. The vehicle projection lens as claimed in claim 9, wherein a total track length of the vehicle projection lens is smaller than 90 mm.

15. The vehicle projection lens as claimed in claim 9, wherein a modulation transfer function for the vehicle projection lens measured at a spatial frequency of 10 lp/mm and a wavelength of 550 mm is smaller than 25%.

16. The vehicle projection lens as claimed in claim 9, wherein a ratio of the lens diameter of the first lens to an image height is greater than 3.

17. A vehicle lamp, comprising:
a light source comprised of an LED array;
a vehicle projection lens disposed downstream from and in a light path of the light source and consisting essentially of four lenses with refractive powers, and the vehicle projection lens comprising:
a non-glass first lens, the first lens being an aspheric lens;
a glass second lens having a positive refractive power;
a glass third lens having a refractive power;
a glass fourth lens having a positive refractive power; and
an aperture stop disposed between the first lens and the second lens,
wherein an F-number of the vehicle projection lens is smaller than or equal to 0.8; and
a vehicle lampshade disposed downstream from and in a light path of the vehicle projection lens.

18. The vehicle lamp as claimed in claim 17, wherein the light source is a micro LED array.

19. The vehicle lamp as claimed in claim 17, wherein a ratio of a lens diameter of the first lens to a lens diameter of the second lens is greater than 1.4.

20. The vehicle lamp as claimed in claim 17, wherein a ratio of an interval between the first lens and the second lens to an overall length of the vehicle projection lens is within a range of 0.33 to 0.45.

* * * * *